Nov. 3, 1925.
E. HOPKINSON
VULCANIZING PROCESS
Original Filed March 7, 1921
1,559,702
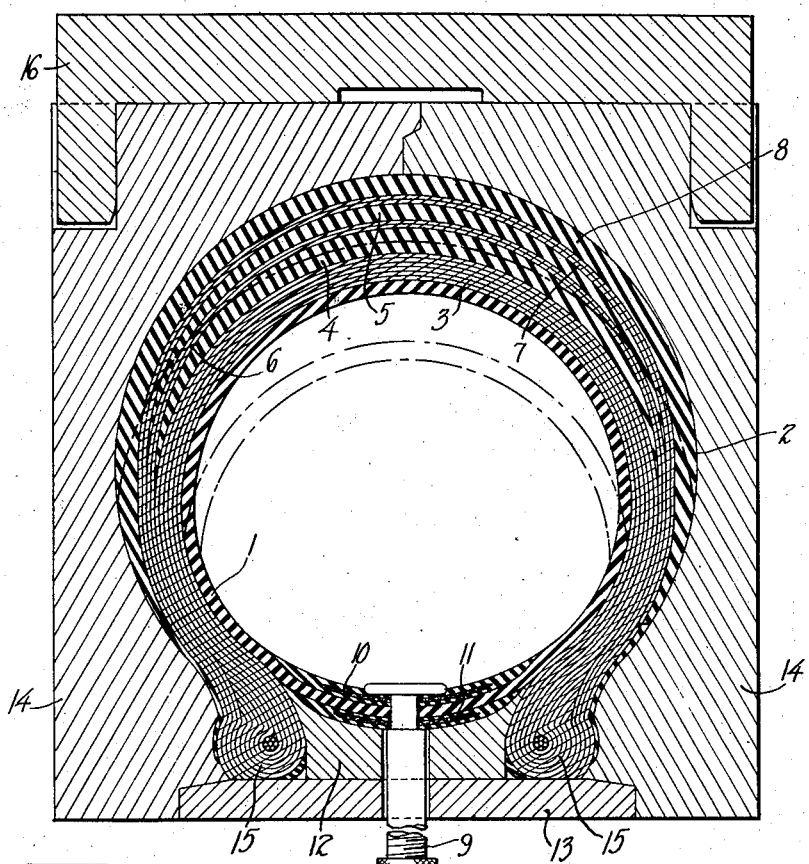
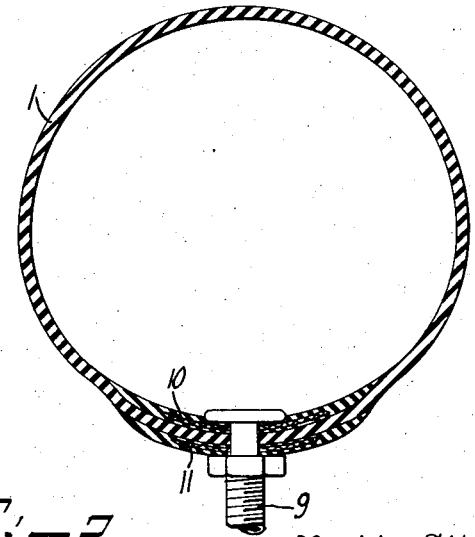
Inventor
ERNEST HOPKINSON
By his Attorney Patented Nov. 3, 1925.

1,559,702

UNITED STATES PATENT OFFICE.

ERNEST HOPKINSON, OF NEW YORK, N. Y.

VULCANIZING PROCESS.

Original application filed March 7, 1921, Serial No. 450,193. Divided and this application filed January 8, 1924. Serial No. 684,932.

*To all whom it may concern:*

Be it known that I, ERNEST HOPKINSON, a citizen of the United States, and a resident of New York city, county of New York, and State of New York, have invented a certain new and useful Vulcanizing Process, of which the following is a full, clear, and exact description.

This invention relates to the manufacture of tubes and casings for motor vehicles, and more particularly, a process for simultaneously vulcanizing them.

This application is a division of my pending application, Serial No. 450,193, filed March 7th, 1921, issued as U. S. Patent 1,493,674 on May 13, 1924, and which in turn is a division of U. S. Patent 1,374,505, granted April 12, 1921.

Inner tubes are usually made and vulcanized on circular poles or mandrels in straight lengths. Afterwards, their ends are spliced to make a complete annulus, and the valve-stem mounted. The finished tubes are usually a little smaller on their outer and a little larger on their inner peripheries than the corresponding dimensions of the cavity in the casing for which they are intended.

The present invention aims to provide a process for simultaneously vulcanizing both the tubes and the casings so that the former may be utilized as an air-bag or fluid-container for fluid under pressure which it is desirable to apply to the inside surfaces or walls of tire casings during their vulcanization. The finished tube substantially exactly fills the cavity of the casing in which it is vulcanized. The valve-stem is preferably utilized as a means for introducing fluid under pressure and is vulcanized in position so that possibility of leakage around the valve-stem is minimized. The stock for making the inner tube is spliced before its introduction in the casing in any manner suitable to hold fluid under pressure. The joints of the tube, being subjected to fluid under pressure during vulcanization of both the tube and the casing, are necessarily cured in a fluid-tight condition. The vulcanized inner tube very nearly fits the cavity of the casing and, consequently, after both have been vulcanized and removed from the mold, the walls of the inner tube are not subjected to any substantial or objectionable amount of distension when inflated in service on a wheel rim.

An embodiment of the invention is illustrated in the accompanying drawings, in which:—

Figure 1 is a cross-section of a mold-enclosing casing and tube;

And Figure 2 is a cross-section of a completed tube.

In the drawings, the inner tube is indicated at 1 and the casing at 2. The latter may be made of plies of fabric 3, cushion stocks 4 and 5, breaker strips 6 and 7, and tread stock 8, in any desirable arrangement or relation, either as shown or varied in accordance with the practices obtaining among various manufacturers. But, preferably, the casing is made as disclosed in detail in Hopkinson Patent No. 1,374,505, granted April 12th, 1921.

The inner tube 1 is preferably made of unvulcanized rubber composition without reinforcement excepting in the region of a valve-stem 9, where sections or patches 10 and 11 of rubberized fabric (woven or weftless) are preferably incorporated. Any convenient method may be employed to amass the rubber in hollow annular form. The tube may be introduced into the casing in either a green or semi-vulcanized condition. Generally, the practice is to apply the reinforcing patches 10 and 11, then punch a hole through the tube for the reception of the valve-stem 9, before the green or semi-cured tube in introduced into the casing.

The tube is mounted on a bull-ring 12, whose function it is, in co-operation with an annular base 13 and mold members 14, to give the exact size necessary to the bead portions 15 of the casing 2. The inner tube 1, after being mounted on the bull-ring 12, is introduced into the casing 2, which, if made according to said Hopkinson Patent 1,374,505, does not fill the cavity in the mold sections 14. The molding parts 13 and 14, and the clamps 16, are assembled, as shown in Figure 1, and fluid under pressure, preferably $CO_2$, is supplied to the tube 1, but any other suitable gas, or mixture of gases, such as air or liquid, may be employed if desired.

To prevent the tube 1 from adhering to the casing 2 during vulcanization, it is slightly inflated and coated with glycerine, talc, graphite, starch, powder mica, the paint powder known as "aluminum bronze," or other suitable substance. Aluminum bronze is preferred as it imparts a beautiful silvery appearance to the finished casing and tube, and also serves as a lubricant in service. After coating the tube 1, and also the casing 2, if desired, as is preferable, the two are assembled in a mold, as already mentioned, and subjected to fluid under pressure, preferably around 180 pounds to the square inch. The complete assemblage is then subjected to vulcanizing treatment, in a French press or vulcanizer, for instance, with steam at a pressure around 40 pounds, yielding a heat in the neighborhood of 280° F. During vulcanization, the rubber softens somewhat and the casing is stretched so as to completely fill the cavity in and be pressed firmly against the mold sections 14, taking therefrom any design desired to provide an anti-skid character to the tread of the casing.

After vulcanization, the tube and casing are removed from the mold and the bull-ring. The tube may be left in the casing and sold therewith, as a complete unit, or it may be removed and sold separately, as desired.

From the foregoing it will be seen that by this invention the cost of so-called "air-bags" is very largely eliminated, that the tube is vulcanized as an incident to the vulcanization of the casing, that the walls of the tube 1 (being much thinner than usual for air-bags) require less heat for satisfactory vulcanization, and that the finished tube is adapted to fill a casing in service without distension, at least in the region of the tread where distension is undesirable, as it enhances, rather than diminishes, the liability of puncture.

It will be obvious that changes may be made without departing from the principles underlying the invention and reference should therefore be made to the accompanying claims for an understanding of its scope. In the claims, the term "casing" is used as understood today, and refers to and comprehends only that construction of cover for an inner tube which is open throughout its entire inner circumference and is approximately U-shaped or horseshoe-shaped in cross-section.

Having thus described my invention, what I claim and desire to protect by Letters Patent is:—

1. That method of vulcanizing tire tubes and casings which consists in, assembling an incompletely vulcanized annular tube and casing in nested relation with a substance between them preventing their union during vulcanization, completely enclosing the nested tube and casing in mold members, and simultaneously vulcanizing both the tube and casing while maintaining a wall-compacting fluid pressure on the interior of the tube.

2. That method of vulcanizing tire tubes and casings which consists in, assembling an incompletely vulcanized annular tube and casing in nested relation with a substance between them preventing their union during vulcanization, completely enclosing the nested tube and casing in mold members, simultaneously vulcanizing both the tube and casing while maintaining a wall-compacting fluid pressure on the interior of the tube, and finally separating the vulcanized annular tube from the vulcanized casing.

3. That method of vulcanizing annular tire tubes and casings which consists in, building a casing of strain-resisting-elements and unvulcanized rubber composition, making an inner tube of incompletely vulcanized rubber composition in an annular form and with a valve-stem mounted therein, supporting the incompletely vulcanized inner tube upon an annular member of a width adapted to close the space between the bead portions of the casing, nesting the thus-mounted tube within the casing, substantially completely confining the nested tube and casing in molding members, and vulcanizing the assemblage while applying fluid under pressure to the interior of the tube.

Signed at New York city, county of New York, and State of New York, this 3rd day of January, 1924.

ERNEST HOPKINSON.